United States Patent Office 2,965,586
Patented Dec. 20, 1960

2,965,586

HEAT-HARDENABLE COMPOSITIONS COMPOSED OF POLYVINYL CHLORIDE, EPOXY RESIN AND HARDENING AGENT, CELLULAR PRODUCT AND METHOD OF PREPARING SAME

Willy Fisch, Binningen, Robert Hiltpold, Basel, and Hans Batzer, Arlesheim, Switzerland, assignors to Ciba Limited, Basel, Switzerland No Drawing. Filed Feb. 25, 1958, Ser. No. 717,331

Claims priority, application Switzerland Mar. 1, 1957

18 Claims. (Cl. 260—2.5)

Paste-like to liquid, heat hardenable compositions which contain an epoxy resin, polyvinyl chloride together with a plasticizer, such as dioctylphthalate, tricresyl phosphate or octyl cresyl phosphate, and as hardening agent an amine, such as diethylamine, diethylene triamine or piperidine, or a complex compound of boron trifluoride and cresol, are known. Compositions composed of an epoxy resin, polyvinyl chloride and a plasticiser, such as di-(2-ethyl-hexyl)-phthalate, are known which contain a hardening agent insoluble in epoxy resins, such as dicyandiamide or phthalic anhydride, and are prepared with the use of a reaction product of bentonite with an amine as suspending agent. Electric insulating compositions are also known, which are composed of low melting epoxy resin, polyvinyl chloride or a copolymer of vinyl chloride with vinyl acetate, di-(2-ethyl-butyl)-phthalate, antimony trioxide and an amine hardener such as diethylene triamine or meta-phenylene diamine. When meta-phenylene diamine, which is insoluble in epoxy resins, is used a suitable solvent is also added.

Characteristic of the above compositions is the use of plasticisers and, if desired, suspending agents or solvents. These are added in order to obtain mixtures which are capable of being cast at room temperature or at least pastes that spread well at that temperature. However, the presence of plasticisers and solvents is often undesirable and disadvantageous, because insufficiently hard products are obtained if plasticisers are used, and because the solvents, which evaporate during hardening, lead to high shrinkage values, which render the mixture useless for casting. When polycarboxylic anhydrides, such as phthalic anhydride, have been used as hardening agents it has hitherto been found essential to add a suspending agent, such as a reaction product of bentonite with an amine, in order to obtain homogeneous paste-like polyvinyl chloride compositions. The present invention is based on the unexpected observation that compositions composed of polyvinyl chloride and an epoxy resin, such as casting, impregnating or spreadable compositions, which are paste-like or liquid at room temperature can be made without the use of a solvent or suspending agent, by using certain polycarboxylic acid anhydrides as hardeners. Such compositions yield upon being hardened with heat products which have the same hardness as the non-plastized polyvinyl chloride.

Accordingly, the present invention provides compositions, especially casting, impregnating or spreadable compositions which are heat-hardenable and paste-like to liquid at room temperature, and are composed of powdered polyvinyl chloride, an epoxy resin and, as hardening agent a polycarboxylic anhydride, which is capable of forming with the epoxy resin, at least upon being so heated with the resin as to avoid gelatinisation, and being subsequently cooled, a mixture that is liquid at room temperature. The term "liquid" is used herein to denote mixtures having consistencies ranging from that of an easily mobile liquid to that of honey.

As polyvinyl chloride there may be used the pulverulent polymer available in commerce for making up into pastes, for example, as described in "Plastics Engineering Handbook" (Soc. Plast. Ind.) Reinhold Publishing Corp., New York (1954), page 270 et seq. The term "polyvinyl chloride" is used herein also to include paste-forming copolymers of vinyl chloride with a certain proportion of other copolymerisable compounds such as vinylidene chloride, of a vinyl ether, or of a vinyl ester, especially vinyl acetate, mixed esters with maleic acid anhydride, fumaric acid or mixtures thereof.

As epoxy resins there may be mentioned polyglycidyl ethers or esters, such as are obtainable in known manner by the reaction of an epoxy-compound, especially epichlorhydrin, or a substance yielding epichlorhydrin, such as glycerine dichlorhydrin, with a polyhydroxy- or polycarboxy-compound in the presence of an alkali or with an alkali metal salt of the polyhydroxy- or polycarboxy-compound. Of special interest are the polyglycidyl ethers obtained from polyhydric phenols such as resorcinol, hydroquinone or especially 4:4'-dihydroxydiphenyl-dimethoxide. There are also suitable polyglycidyl esters of aliphatic hydroxy compounds such as glycols or glycerine, or of phenol formaldehyde condensation products, and also simple polyepoxy-compounds, such as butadiene dioxide. There are also suitable polyglycidyl esters of aromatic dicarboxylic acids, such as phthalic acid and terephthalic acid and epoxidized tetrahydrophthalic acid derivatives. The invention also embraces the use of epoxide compounds or epoxy resins containing amine groups. There may also be used mixtures of epoxy resins. Especially suitable are epoxy resins liquid at room temperature, for example, those of 4:4'-dihydroxydiphenyl-dimethylmethane which have an epoxide content of about 3.8 to 5.8 epoxide equivalents per kilogram. There may also be used solid epoxy resins, but compositions so obtained are not equally satisfactory for all purposes.

As polycarboxylic anhydrides, for example, anhydrides of polybasic carboxylic acids which are capable of forming with the epoxy resin, at least upon being so heated with the resin as to avoid gelatinisation, and subsequently cooled, a mixture that is liquid at room temperature, there may be used polycarboxylic anhydrides, such as methyl-endomethylene-tetrahydrophthalic anhydride, dodecenyl-succinic anhydride or hexahydrophthalic anhydride, which themselves possess the aforesaid property, or especially mixtures of polycarboxylic anhydrides, which mixtures are liquid at room temperature after their components have been melted together and cooled, for example, a mixture of hexahydrophthalic anhydride with tetrahydrophthalic anhydride and/or phthalic anhydride, and also a mixture of hexachloro-endomethylene tetrahydrophthalic anhydride with hexahydrophthalic anhydride or with methylenedomethylene-tetrahydrophthalic anhydride with or without endomethylene-tetrahydrophthalic anhydride, or like mixture.

The proportion of the polycarboxylic anhydride or mixture of polycarboxylic anhydrides depends on the quantity of reactive epoxide groups present. For example, about 0.4 to 1.5, and advantageously 0.6 to 1.2, anhydride equivalents are used for each epoxide equivalent. The relative proportions of epoxy resin-polycarboxylic anhydride mixture to polyvinyl chloride is so chosen that the composition has a liquid to paste-like consistency at room temperature. Paste-like compositions are obtained, for example, with about 1 part by weight of epoxy resin-carboxylic anhydride mixture and 2 parts by weight of polyvinyl chloride. When the ratio of the aforesaid components is about 1:1 there are usually obtained compositions which are liquid at room temperature and are suitable for casting.

There may be incorporated in the compositions of this invention the usual additions, such as accelerators, pigments, extenders or filling materials. The expert will be able to select these modifying agents so that the properties of the hardened products are those required for the intended purpose. Usually, in the case of polyvinyl chloride the customary heat and light stabilizers, are added. As hardening accelerators there are suitable amines, especially aromatic or aliphatic polyamines. If necessary, the epoxy resin may be diluted with a mono-epoxide compound or the polycarboxylic anhydride mixture may be at least partially reacted with the resin to give better stability and homogeneity. As extenders or fillers there may be used, for example, glass fibers, mica, quartz meal, cellulose, kaolin or metal powder.

The method of making the compositions of this invention depend principally on the properties of the epoxy resins and polycarboxylic anhydrides to be used. When these two components form a mixture that is liquid at room temperature the liquid mixture can be mixed at room temperature with polyvinyl chloride and any other addition or all the components of the composition may be mixed together simultaneously at room temperature, advantageously on a 3-roller mill or in a vacuum mixer in order to prevent bubble formation. If, on the other hand, the epoxy resin and polycarboxylic anhydride form only at a raised temperature a homogeneous mixture which is liquid at room temperature after being cooled, the liquid mixture may be made first and then mixed at room temperature with the other components of the composition. The expert will be capable of deciding by simple tests what method is suitable in any particular case or what changes may be desirable in the procedure.

The compositions of this invention are plastisols and are excellently suited for the production of coatings, laminated materials, intermediate materials, printing pastes and castings. They are especially useful as compositions to be applied with a spatula, impregnating resins, or embedding compositions. By the addition of a blowing agent, such as azo-diisobutyronitrile, foamed materials of high quality can be made with the compositions of this invention. Especially suitable is a 2-stage blowing method (such as is described in "Kunststoffe," vol. 44 (1954), page 542 et seq.) in which the first stage a homogeneous paste is gelatinised in a closed mould at about 150° C. under pressure, the moulded article is removed from the mould after cooling, whereupon an initial expansion takes place, and then in the second stage the final expansion and hardening are brought about at 100° C. without a mould. Depending on the proportion of the blowing agent used, for example, up to 30% of azo-diisobutyronitrile calculated on the plastisol, there are obtained in this manner products which range from hard foamed materials of high resistance to pressure and uniform pore size to products having a bulk density of about 0.03 gram per cubic centimeter. By the addition of a plasticiser, such as dioctyl phthalate, foamed materials can also be obtained which are distinguished by having a better dimensional stability than the usual foamed materials of plasticised polyvinyl chloride having no epoxy resin addition.

The following examples illustrate the invention, the parts and percentages being by weight, and, unless otherwise stated, the epoxy resin is a polyglycidyl ether of 4:4'-dihydroxydiphenyl-dimethylmethane and the polyvinyl chloride is an ordinary commercial pulverulent polymer suitable for making into pastes:

Example 1

100 parts of pulverulent polyvinyl chloride "Lonza" are intimately mixed at room temperature with 25 parts of a liquid epoxy resin having an epoxide content of about 5.1 epoxide equivalents per kilogram, and 25 parts of (a) dodecenyl-succinic anhydride or (b) methylenedomethylene-tetrahydrophthalic anhydride, or with 20 parts of a liquid mixture obtained by melting together the following components and allowing the mixture to cool to room temperature:

(c) 78% of hexahydrophthalic anhydride, 13% of tetrahydrophthalic anhydride and 9% of phthalic anhydride or (d) 70% of hexahydrophthalic anhydride, 25% of tetrahydrophthalic anhydride and 5% of phthalic anhydride or (e) 75% of hexahydrophthalic anhydride and 25% of tetrahydrophthalic anhydride. There is obtained a paste which can be spread well at room temperature.

The polyvinyl chloride pastes so prepared were applied to small metal plates and gave hard solid coatings after being hardened for one hour at 160° C.

By the addition of an amine accelerator, for example, tri - (dimethylamino) - methyl - phenol, in a proportion amounting to about 1% calculated on the weight of the anhydride, the hardening period is considerably shortened. By adding to the compositions about 2 parts of a stabiliser, such as lead stearate or basic lead carbonate, there are obtained pastes that can be spread well, and after being hardened on a support yield hard solid coatings of lighter color than do pastes which do not contain the stabiliser.

By using 50 parts of polyvinyl chloride, instead of 100 parts, there are obtained compositions which are liquid at room temperature, are suitable as casting compositions and, after being cast, gelatinised and hardened at 160° C., they yield moulded articles having the same Shore hardness as non-plasticised polyvinyl chloride.

Instead of epoxy resin having an epoxide content of 5.1 epoxide equivalents per kilogram, there may be used with substantially the same result an epoxy resin having an epoxide content of 4.6 epoxide equivalents per kilogram.

The aforesaid spreadable to liquid compositions of the invention can also be made by first mixing the epoxy resin with one of the anhydride components (a), (b), (c), (d) or (e) at room temperature, and then mixing the resulting mixture with the polyvinyl chloride and any other additions.

Example 2

50 parts of epoxy resin which is very viscous at room temperature and has an epoxide content of 3.9 epoxide equivalents per kilogram, 100 parts of the powdered polyvinyl chloride described in Example 1, 40 parts of the anhydride component (c) described in Example 1, and 2 parts of lead stearate are intimately mixed together at room temperature to form a composition that can be spread well. The composition so obtained is applied to metal plates and hardened for one hour at 160° C. In this manner there are obtained coatings or films having a hard a hard and smooth surface.

Example 3

By intimately mixing together 25 parts of a polyglycidyl ether of ethylene glycol which is liquid at room temperature and has an epoxide content of about 5.0 epoxide equivalents per kilogram, 20 parts of anhydride component (c) described in Example 1, 100 parts of the powdered polyvinyl chloride described in Example 1, and 2 parts lead stearate, there is obtained a composition which is paste-like at room temperature and when hardened for one hour at 160° C. yields hard products, which usually have a darker and rougher surface than the products obtained as described in the preceding examples.

Example 4

To a mixture of 50 parts of the pulverulent polyvinyl chloride described in Example 1, 25 parts of butadiene dioxide and 1 part of lead stearate are added, on the one hand, 90 parts of anhydride mixture (c) described in Example 1 and, on the other, 90 parts of hexahydrophthalic anhydride. In both cases there is obtained a paste that can be spread very well, and which, when gelatinized for ½ hour and hardened at 160° C., yields rather soft products which after-harden during storage. Instead of 90 parts of anhydride a smaller quantity may be used, for example, 40 parts. By hardening such a composition at 160° C. for ½ hour there is obtained a flexible product, which also becomes hard after being stored for some time.

*Example 5*

75 parts of an epoxy resin which is liquid at room temperature and has an epoxide content of 5.1 epoxide equivalents per kilogram, and 60 parts of anhydride mixture (c) described in Example 1 are triturated to form a paste with 100 parts of pulverulent copolymer of about 96% of vinyl chloride and 4% of vinyl acetate ("Vinylite" VYNV-1 or VYNV-2) and 2 parts of lead stearate. The paste is applied to steel plates and gelatinized at 160° C. for one hour and hardened. There are obtained protective coatings or films having a hard smooth surface.

*Example 6*

100 parts of the pulverulent polyvinyl chlorides described in Example 1, 25 parts of a polyglycidyl ester of phthalic acid (Metallon K of the firm Henkel), 20 parts of the anhydride mixture (c) described in Example 1 and 2 parts of lead stearate are worked up into a paste. The paste is applied to steel plates or glass plates and hardened for one hour at 160° C., whereby hard, somewhat rough protective coatings are obtained.

*Example 7*

25 parts of an epoxy resin which is liquid at room temperature and contains 5.1 epoxide equivalents per kilogram are mixed with 25 parts of a liquid anhydride mixture consisting of 55 parts of hexahydrophthalic anhydride and 45 parts of hexachloro-endomethylene-tetrahydrophthalic anhydride, and the mixture is triturated to form a paste with 55 parts of pulverulent polyvinyl chloride ("Geon 121," B. F. Goodrich Chem. Co.), 45 parts of a pulverulent copolymer of vinyl chloride and vinylidene chloride ("Geon 202," containing about 6% of vinylidene chloride) and 1 part of lead stearate. The paste is applied to a steel plate and is gelatinized and hardened for 15 minutes at 160° C., whereby a hard protective coating is produced.

*Example 8*

To 25 parts of an epoxy resin which is liquid at room temperature and contains 5.1 epoxide equivalents per kilogram are added 25 parts of a liquid anhydride mixture consisting of 70 parts of methyl-endomethylene-tetrahydrophthalic anhydride and 30 parts of hexachloro-endomethylene-tetrahydrophthalic anhydride, and the mixture is triturated to form a paste with 55 parts of pulverulent polyvinyl chloride "Geon 121," 45 parts of a pulverulent copolymer of vinyl chloride and vinylene chloride "Geon 202" and 1 part of lead stearate. The paste is applied to a steel plate or glass plate, and is gelatinised and hardened for 15 minutes at 160° C., whereby a hard smooth protective coating is formed.

*Example 9*

40 parts of pulverulent polyvinyl chloride "Lonza," 20 parts of an epoxy resin which is liquid at room temperature and contains 5.1 epoxide equivalents per kilogram, 2.6 parts of cresyl glycide, 17.4 parts of the liquid anhydride mixture (c) described in Example 1, 0.8 part of lead stearate and 8 parts of azo-diisobutyronitrile are triturated in a three-roller mill to form a homogeneous paste. The paste is cast in a mould of non-hardened steel which has been preheated to 80° C., and consists of a ring having an internal diameter of about 10 centimeters having conically fitting polished base and cover plates, the internal height of the closed mould being 0.8 centimeter. Then the paste in the tightly filled, closed mould is gelatinised under pressure for about 5 minutes at 150° C., and is subsequently cooled in the course of about 15 minutes to room temperature. Upon removing the moulded shape from the mould it instantly expands to about 4-5 times its original volume, which corresponds to a bulk density of about 0.3 gram per cubic centimeter. The foamed article is then tempered for 16 hours at 100° C., during which a further expansion to 3-4 times its original volume and hardening take place. The foamed article which is still soft at 100° C. is rigid and hard after being cooled to room temperature. It has fine uniform closed cells, and a bulk density of about 0.08 gram per cubic centimeter and a compression strength of about 0.08 kilogram per square millimeter.

If in the procedure described above the content of blowing agent (azo-diisobutyronitrile) in the mixture is changed to contain the following quantities of blowing agent the following bulk densities are obtained:

| Parts of azo-diisobutyronitrile: | Bulk density (gram per cc.) |
|---|---|
| 0 | 1.3 |
| 1 | 0.7 |
| 2 | 0.3 |
| 4 | 0.2 |
| 8 | 0.08 |
| 12 | 0.06 |
| 16 | 0.04 |
| 24 | 0.03 |

*Example 10*

If in the paste described in the first paragraph of Example 9 which has a viscosity of approximately 10,000 centipoises the quantities of polyvinyl chloride, stabilizing agent and blowing agent remain the same but the proportion of the other components is doubled or halved, pastes are formed with about 3,000 centipoises and over 30,000 centipoises respectively. By the process described in Example 9 there are formed from these pastes in the first case cellular bodies with relatively coarse cells (on an average about 1 mm. in diameter), whilst in the second case cellular bodies with very fine cells (on an average roughly 0.1 mm. in diameter) are obtained.

The same results can be achieved by using azohexahydrobenzonitrile instead of azo-diisobutyronitrile as blowing agent.

*Example 11*

50 parts of the pulverulent polyvinyl chloride used in Example 9, 25 parts of the liquid epoxy resin described in Example 9, 25 parts of hexahydrophthalic anhydride, 1 part of lead stearate and 20 parts of azo-diisobutyronitrile are triturated in a three-roller mill to form a homogeneous paste. A foamed article is prepared from this paste as described in Example 9. The so-obtained foamed article has a bulk density of about 0.04 gram per cubic centimeter and has a compression strength of about 0.08 kilogram per square millimeter which is relatively high for foamed articles of such a bulk density.

If 10 parts of azo-diisobutyronitrile only are used instead of 20 parts, foamed articles of particularly regular cellular structure are obtained (average cell diameter about 0.3 mm.) with a bulk density of about 0.10 gram per cubic centimeter and a compression strength of about 0.11 kilogram per square millimeter.

*Example 12*

25 parts of epoxy resin which is liquid at room temperature and has an epoxide content of 5.1 epoxide equivalents per kilogram, 25 parts of methyl-endomethylene-tetrahydrophthalic anhydride, 100 parts of pulverulent polyvinyl chloride as described in Example 1, 2 parts of dibasic lead phosphite as stabilizer are triturated to form a paste. The paste is spread on steel plates to form a layer about 1 mm. thick and is gelatinized and hardened at 160° C. for one hour. A coating with a hard and smooth surface is obtained. If instead of pure methyl-endomethylene-tetrahydrophthalic anhydride the same quantity of a 0.6 or 0.8% solution of boron-trifluoride in methyl-endomethylene-tetrahydrophthalic anhydride (prepared by introducing gaseous boron-trifluoride into methyl-endomethylene-tetrahydrophthalic anhydride with ice cooling) is used, a paste is obtained which, when spread on steel plates and gelatinized and hardened for 30 or 15 minutes at 160° C., gives a hard and smooth coating.

If the above pastes are worked up on mixing rollers, in the case of the paste without boron-trifluoride a not quite completely hardened foil (about 2–3 mm. thick) is obtained after being rolled for 15 minutes at 160° C. By the addition of 0.6 or 0.8% of boron-trifluoride to the anhydride hardening agent there is obtained after rolling for 10 to 15 minutes and 5 minutes respectively at 160° C. a hard rolled foil after cooling.

Similar results are obtained when instead of methyl-endomethylene-tetrahydrophthalic anhydride the anhydride mixture (c) described in Example 1 with 15% cresyl glycide is used in the above experiments.

What is claimed is:

1. A heat-hardenable composition which has a paste-like to liquid consistency at room temperature and which consists of polyvinyl chloride in powder form, an 1,2-epoxy resin in which the oxygen atom is attached to adjacent carbon atoms, and as a hardening agent for said 1,2-epoxy resin a polycarboxylic anhydride selected from the class consisting of hexahydrophthalic acid anhydride, methyl-endomethylene-tetrahydrophthalic acid anhydride and dodecenyl succinic acid anhydride.

2. A composition as claimed in claim 1 in which the hardening agent is hexahydrophthalic acid anhydride.

3. A composition as claimed in claim 1 in which the hardening agent is methyl-endomethylene tetrahydrophthalic acid anhydride.

4. A composition as claimed in claim 1 in which the hardening agent is dodecenyl succinic acid anhydride.

5. A heat-hardenable composition which has a paste-like to liquid consistency at room temperature and which consists of polyvinyl chloride in powder form, an 1,2-epoxy resin in which the oxygen atom is attached to adjacent carbon atoms, and as a hardening agent for said 1,2-epoxy resin a mixture of polycarboxylic anhydrides which contains at least one polycarboxylic acid anhydride selected from the class consisting of hexahydrophthalic acid anhydride, methyl-endomethylene-tetrahydrophthalic acid anhydride and dodecenyl succinic acid anhydride.

6. A composition as claimed in claim 5, in which the hardening agent is an anhydride mixture that is liquid at room temperature and has been obtained by melting hexahydrophthalic anhydride and tetrahydrophthalic anhydride together and then cooling the mixture.

7. A composition as claimed in claim 5, in which the hardening agent is an anhydride mixture that is liquid at ordinary temperature and has been obtained by melting together hexahydrophthalic anhydride, tetrahydrophthalic anhydride and phthalic anhydride, and then cooling the mixture that is liquid at room temperature.

8. A heat-hardenable composition which has a paste-like to liquid consistency at room temperature and which consists of polyvinyl chloride in powder form, an 1,2-epoxy resin in which the oxygen atom is attached to adjacent carbon atoms, and as a hardening agent for said 1,2-epoxy resin a polycarboxylic acid anhydride selected from the class consisting of hexahydrophthalic acid anhydride, methyl-endomethylene-tetrahydrophthalic acid anhydride and dodecenyl succinic acid anhydride, and in which composition the relative proportions of 1,2-epoxy resin to polycarboxylic anhydride are such that there is one epoxide equivalent for every 0.6–1.2 anhydride equivalent.

9. A heat-hardenable composition which has a paste-like to liquid consistency at room temperature and which consists of polyvinyl chloride in powder form, an 1,2-epoxy resin in which the oxygen atom is attached to adjacent carbon atoms, and as a hardening agent for said 1,2-epoxy resin a polycarboxylic acid anhydride selected from the class consisting of hexahydrophthalic acid anhydride, methyl-endomethylene-tetrahydrophthalic acid anhydride and dodecenyl succinic acid anhydride, and in which composition the content of epoxy resin is at least one part for every 4 parts by weight of polyvinyl chloride.

10. A heat-hardenable composition which has a paste-like to liquid consistency at room temperature and which consists of polyvinyl chloride in powder form, an 1,2-epoxy resin in which the oxygen atom is attached to adjacent carbon atoms, and as a hardening agent for said 1,2-epoxy resin a polycarboxylic acid anhydride selected from the class consisting of hexahydrophthalic acid anhydride, methyl-endomethylene-tetrahydrophthalic acid anhydride and dodecenyl succinic acid anhydride, a mixture that is liquid at room temperature and which composition further contains a blowing agent selected from the class consisting of azo-di-(isobutyronitrile) and azo-hexahydrobenzonitrile.

11. A composition as claimed in claim 10, in which the blowing agent is azo-di-(isobutyronitrile).

12. A composition as claimed in claim 10, in which the blowing agent is azo-hexahydrobenzonitrile.

13. A heat-hardenable composition which has a paste-like to liquid consistency at room temperature and which consists of polyvinyl chloride in powder form, a polyglycidyl ester of a polycarboxylic acid and as a hardening agent for said polyglycidyl ester of a polycarboxylic acid a polycarboxylic acid anhydride selected from the class consisting of hexahydrophthalic acid anhydride, methyl-endomethylene-tetrahydrophthalic acid anhydride and dodecenyl succinic acid anhydride.

14. A heat-hardenable composition which has a paste-like to liquid consistency at room temperature and which consists of polyvinyl chloride in powder form, a polyglycidyl ether of a polyhydric alcohol and as a hardening agent for said polyglycidyl ether of a polyhydric alcohol a polycarboxylic acid anhydride selected from the class consisting of hexahydrophthalic acid anhydride, methyl-endomethylene-tetrahydrophthalic acid anhydride and dodecenyl succinic acid anhydride.

15. A heat-hardenable composition which has a paste-like to liquid consistency at room temperature and which consists of polyvinyl chloride in powder form, a polyglycidyl ether of a polyhydric phenol and as a hardening agent for said polyglycidyl ether of a polyhydric phenol a polycarboxylic acid anhydride selected from the class consisting of hexahydrophthalic acid anhydride, methyl-endomethylene-tetrahydrophthalic acid anhydride and dodecenyl succinic acid anhydride.

16. A heat-hardenable composition which has a paste-like to liquid consistency at room temperature and which consists of polyvinyl chloride in powder form, a polyglycidyl ether of 4:4'-dihydroxydiphenyl dimethyl-methane and as a hardening agent for said polyglycidyl ether of 4:4'-dihydroxyphenyl dimethyl-methane a polycarboxylic acid anhydride selected from the class consisting of hexahydrophthalic acid anhydride, methyl-endomethylene-tetrahydrophthalic acid anhydride and dodecenyl succinic acid anhydride.

17. A method for producing cellular bodies which comprises heating in confinement a heat hardenable composition which has a paste-like to liquid consistency at room temperature and which consists of polyvinyl chloride in powder form, an 1,2-epoxy resin in which the oxygen atom is attached to adjacent carbon atoms, and as a hardening agent for said 1,2-epoxy resin a polycarboxylic acid anhydride selected from the class consisting of hexahydrophthalic acid anhydride, methyl-endomethylene-tetrahydrophthalic acid anhydride and dodecenyl succinic acid anhydride, and which composition further contains a blowing agent selected from the class consisting of azo-di(isobutyronitrile) and azo-hexahydrobenzonitrile, releasing the molded article from confinement after cooling, whereupon an initial expansion takes place, and then heating the molded article without confinement until final expansion and hardening is brought about.

18. A hardened cellular body which has been obtained by heating in confinement a heat hardenable composition which has a paste-like to liquid consistency at room temperature, and which comprises polyvinyl chloride in powder form, an 1,2-epoxy resin in which the oxygen atom is attached to adjacent carbon atoms, and as a hardening agent for said 1,2-epoxy resin a polycarboxylic acid anhydride selected from the class consisting of hexahydrophthalic acid anhydride, methyl-endomethylene-tetrahydrophthalic acid anhydride and dodecenyl succinic acid anhydride, and which composition further contains a blowing agent selected from the class consisting of azo-di(isobutyronitrile) and azo-hexahydrobenzonitrile, releasing the molded article from confinement after cooling, whereupon an initial expansion takes place, and then heating the molded article without confinement until final expansion and hardening is brought about.

References Cited in the file of this patent

UNITED STATES PATENTS

| | | |
|---|---|---|
| 2,717,216 | Arone | Sept. 6, 1955 |
| 2,739,134 | Parry et al. | Mar. 20, 1956 |
| 2,795,565 | Newey | June 11, 1957 |
| 2,825,282 | Gergen et al. | Mar. 4, 1958 |
| 2,839,495 | Carey | June 17, 1958 |

FOREIGN PATENTS

| | | |
|---|---|---|
| 783,956 | Great Britain | Oct. 2, 1957 | ns
UNITED STATES PATENT OFFICE
CERTIFICATION OF CORRECTION

Patent No. 2,965,586　　　　　　　　　　　　　　December 20, 1960

Willy Fisch et al.

It is hereby certified that error appears in the above numbered patent requiring correction and that the said Letters Patent should read as corrected below.

Column 2, line 22, for "oxide" read -- ylmethane --; same line, for "esters" read -- ethers --.

Signed and sealed this 23rd day of May 1961.

(SEAL)
Attest:

ERNEST W. SWIDER
Attesting Officer

DAVID L. LADD
Commissioner of Patents